US008641502B2

(12) United States Patent
Kato

(10) Patent No.: US 8,641,502 B2
(45) Date of Patent: Feb. 4, 2014

(54) GAMING MACHINE

(75) Inventor: Yoichi Kato, Tokyo (JP)

(73) Assignee: Universal Entertainment Corporation, Toyko (JP)

(*) Notice: Subject to any disclaimer, the term of this patent is extended or adjusted under 35 U.S.C. 154(b) by 572 days.

(21) Appl. No.: 12/252,726

(22) Filed: Oct. 16, 2008

(65) Prior Publication Data

US 2009/0098929 A1 Apr. 16, 2009

(30) Foreign Application Priority Data

Oct. 16, 2007 (JP) ................................ 2007-269292

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC ............................................ 463/20; 463/25

(58) Field of Classification Search
USPC .................................................. 463/20, 25
See application file for complete search history.

(56) References Cited

U.S. PATENT DOCUMENTS

| | | | | |
|---|---|---|---|---|
| 6,517,433 | B2 | 2/2003 | Loose et al. | |
| 2003/0045349 | A1* | 3/2003 | Hughs-Baird | 463/25 |
| 2004/0235553 | A1 | 11/2004 | Iwamoto | |
| 2005/0096123 | A1* | 5/2005 | Cregan et al. | 463/20 |
| 2006/0151944 | A1 | 7/2006 | Jubinville et al. | |
| 2007/0060292 | A1* | 3/2007 | Peterson | 463/20 |
| 2007/0082728 | A1 | 4/2007 | Wilkins et al. | |
| 2009/0042638 | A1* | 2/2009 | Thomas | 463/20 |

FOREIGN PATENT DOCUMENTS

| | | | |
|---|---|---|---|
| CN | 1572350 | A | 2/2005 |
| CN | 1732033 | A | 2/2006 |
| CN | 1943834 | A | 4/2007 |
| JP | 06-246068 | | 9/1994 |
| JP | 2007-503254 | | 2/2007 |
| JP | 2007-195610 | | 8/2007 |

OTHER PUBLICATIONS

Macao Office Action issued on Aug. 9, 2010 in the corresponding to Macao patent application No. I/867.
Japanese Patent Office, Office Action dated Jun. 5, 2012 of JP Patent Application No. 2007-269292.

* cited by examiner

*Primary Examiner* — Melba Bumgarner
*Assistant Examiner* — Jason Pinheiro
(74) *Attorney, Agent, or Firm* — Lexyoume IP Meister, PLLC.

(57) ABSTRACT

A gaming environment is described. If a predetermined number or more marks are displayed in a base game, a progressive chance games will be executed. Also, the progressive chance game is a selection type game. The selectable number of selection items in the progressive chance game is determined based on bet amount in the base game.

12 Claims, 20 Drawing Sheets

FIG. 8

K
Q
K(P)
Q
10
9
10
Q(P)
K
J
10
Q
K(P)
A
Q
Q
★

FIRST REEL

SECOND REEL

FIG. 10

K
J
K(P_MA)
10
9
9
10
A
Q
K(P_MI)
A
J
9
K(P_MAMI)
A
J
J

THIRD REEL

| | of a Kind | | | | | | | |
|---|---|---|---|---|---|---|---|---|
| | 3 | 4 | 5 | 6 | 7 | 8 | 9 | 10 |
| K | 80 | 150 | 250 | 400 | 400 | 400 | | |
| Q | 70 | 120 | 200 | 300 | 300 | 300 | | |
| J | 60 | 100 | 150 | 250 | 250 | 250 | | |
| A | 10 | 15 | 30 | 50 | 110 | 130 | 190 | 210 |
| 10 | 5 | 10 | 20 | 40 | 90 | 110 | 150 | 180 |
| 9 | 5 | 8 | 15 | 30 | 70 | 90 | 130 | 150 |

FIG. 16

| REEL | |
|---|---|
| CODE NUMBER | SYMBOL |
| 00 | K |
| 01 | Q |
| 02 | K(P) |
| 03 | Q |
| 04 | 10 |
| 05 | 9 |
| 06 | 10 |
| 07 | Q(P) |
| 08 | K |
| 09 | J |
| 10 | 10 |
| 11 | Q |
| 12 | K(P) |
| 13 | A |
| 14 | Q |
| 15 | Q |
| 16 | ★ |

FIG. 17

| RANDOM NUMBER VALUE | CODE NUMBER |
|---|---|
| 0~127 | 00 |
| 128~255 | 01 |
| 256~383 | 02 |
| 384~511 | 03 |
| 512~760 | 04 |
| 761~767 | 05 |
| 768~895 | 06 |
| 896~1023 | 07 |
| 1024~1151 | 08 |
| 1152~1279 | 09 |
| 1280~1307 | 10 |
| 1308~1335 | 11 |
| 1336~1364 | 12 |
| 1365~1491 | 13 |
| 1492~1919 | 14 |
| 1920~2047 | 15 |
| 2048~2175 | 16 |

FIG. 18

| RANDOM NUMBER VALUE | SYMBOL |
|---|---|
| 0~127 | K |
| 128~255 | Q |
| 256~383 | K(P) |
| 384~511 | Q |
| 512~760 | 10 |
| 761~767 | 9 |
| 768~895 | 10 |
| 896~1023 | Q(P) |
| 1024~1151 | K |
| 1152~1279 | J |
| 1280~1307 | 10 |
| 1308~1335 | Q |
| 1336~1364 | K(P) |
| 1365~1491 | A |
| 1492~1919 | Q |
| 1920~2047 | Q |
| 2048~2175 | ★ |

GAMING MACHINE

CROSS-REFERENCE TO RELATED APPLICATIONS

This application is based upon and claims a priority from the prior Japanese Patent Application No. 2007-269292 filed on Oct. 16, 2007, the entire contents of which are incorporated herein by reference.

BACKGROUND

1. Field

One or more aspects of the invention relate to a gaming machine.

2. Description of Related Art

Conventionally, gaming machines, which if a predetermined condition is met, special award (for example, winning of a progressive bonus, or shift for a bonus game) is provided, are known. For example, in some conventional gaming machines, if a specific symbol or a specific combination of symbols is displayed on a display, a bonus game will be executed.

Also, to attract players, a gaming machine which has new feature is anticipated.

SUMMARY

In view of the foregoing, one or more aspects of the invention relate to a gaming machine, a gaming method thereof, a computer readable medium having computer-executable instructions or the like in which if a predetermined number or more of marks are displayed, a progressive chance game to be executed is determined based on the number of displayed marks. Also, if a progressive bonus is realized in the progressive chance game, jackpot amount corresponding to the realized progressive bonus will be provided.

A gaming machine related to one or more aspect of the invention comprises a display that displays plural selection items and a processor that control game sessions, the game sessions including a first game and a second game. Also, the processor accepts bet amount, accepts a predetermined indication, executes the first game in response to the accepted indication, executes the second game if a predetermined condition is met, displays the plural selection items on the display in the second game, determines a selectable number of the selection items, and provides an award corresponding to a selected selection item.

Herewith, since the selectable number of selection items is determined based on bet amount in a base game, an entertainment aspect is enhanced and it can attract players.

Also, a gaming machine related to one or more aspects of the invention comprises a display that displays plural symbols and plural selection items and a processor that control game sessions, the game sessions including a first game and a second game. Also, the processor accepts bet amount, accepts a predetermined indication, executes the first game in response to the accepted indication, executes the second game if a combination of the displayed symbols is a winning combination, displays the plural selection items on the display, determines a selectable number of the selection items, and provides an award corresponding to a selected selection item.

Herewith, since the selectable number of selection items is determined based on bet amount in a base game, an entertainment aspect is enhanced and it can attract players.

Also, a gaming machine related to one or more aspects of the invention comprises a display that displays plural video reels having plural symbols and plural selection items and a processor that control game sessions, the game sessions including a first game and a second game. Also, the processor accepts bet amount, accepts a predetermined indication, executes the first game in response to the accepted indication, executes the second game if a combination of the displayed symbols is a winning combination, displays the plural selection items on the display, determines a selectable number of the selection items, and provides an award corresponding to a selected selection item.

Herewith, since the selectable number of selection items is determined based on bet amount in a base game, an entertainment aspect is enhanced and it can attract players.

One or more of the above aspects of the invention will be more fully described in the following detailed description when read in connection with the accompanying drawings. It is to be expressly understood, however, that the drawings are for purpose of illustration only and not intended as a definition of the limits of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

FIG. 8 is a view showing symbol rows displayed on each reel of the slot machine in accordance with one or more aspects of the invention.

FIG. 10 is a view showing symbol rows displayed on each reel of the slot machine in accordance with one or more aspects of the invention.

FIG. 16 is a view showing a table in which each of code numbers corresponds to symbol in the slot machine in accordance with one or more aspects of the invention.

FIG. 17 is a view showing a table in which random number values correspond to code numbers in the slot machine in accordance with one or more aspects of the invention.

FIG. 18 is a view showing a table in which random number values correspond to symbols in the slot machine in accordance with one or more aspects of the invention.

DETAILED DESCRIPTION

Figure 1:
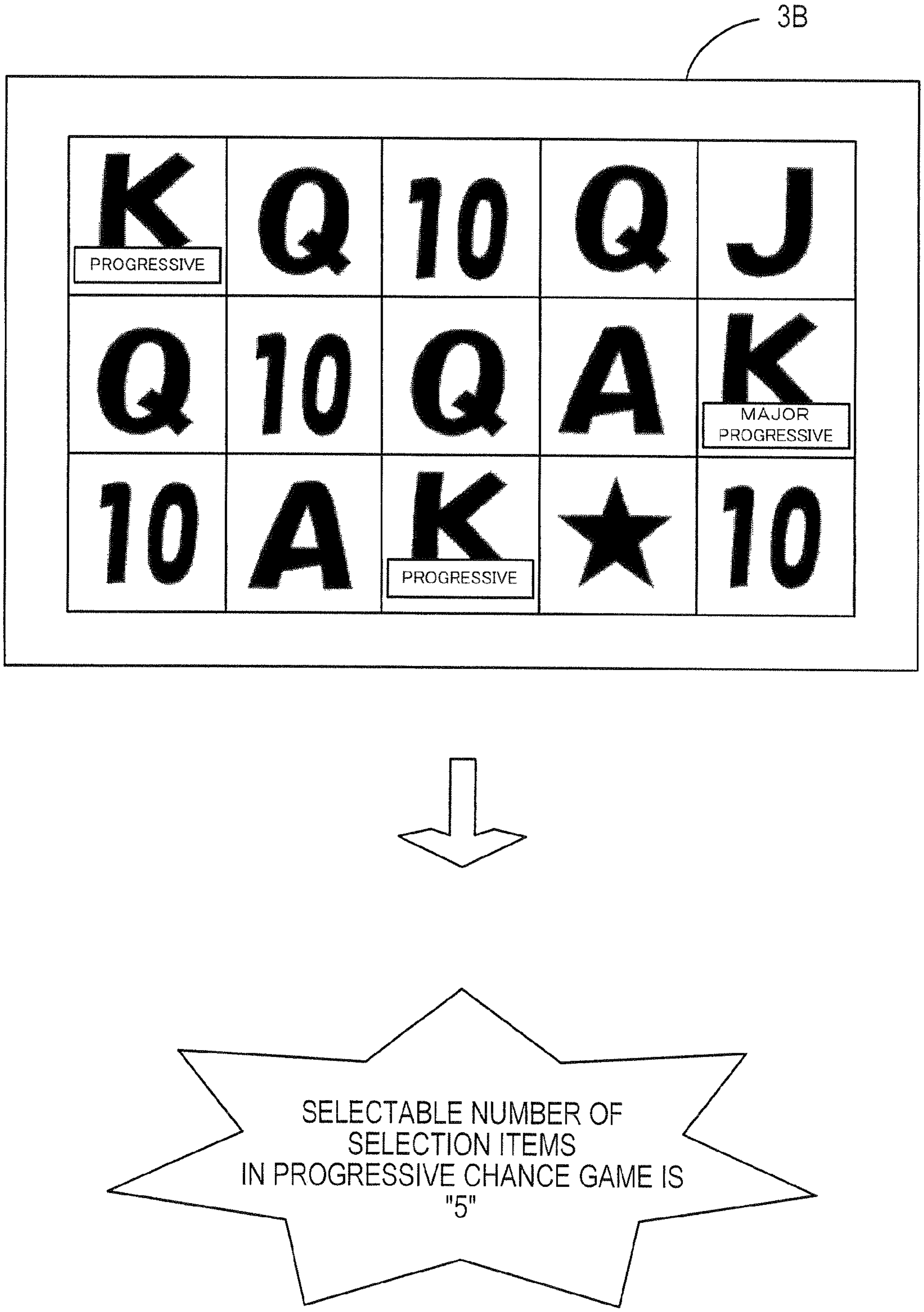
FIG. 1 is a view showing a condition where the selectable number of selection items is determined based on bet amount in accordance with one or more aspects of the invention.

The various aspects summarized previously may be embodied in various forms. The following description shows by way of illustration of various combinations and configurations in which the aspects may be practiced. It is understood that the described aspects and/or embodiments are merely examples, and that other aspects and/or embodiments may be utilized and structural and functional modifications may be made, without departing from the scope of the present disclosure.

It is noted that various connections are set forth between items in the following description. It is noted that these connections in general and, unless specified otherwise, may be direct or indirect and that this specification is not intended to be limiting in this respect.

A gaming machine according to one or more aspects of the invention will be described in detail with reference to the drawings based on an embodiment embodying one or more aspects of the invention as a slot machine. However, it is appreciated that one or more aspects of the invention may be embodied in distributable (via CD and the like) or downloadable software games, console games, and the like. In this regard, the slot machine may be a virtual slot machine that is displayed on a multi-purpose computer and/or dedicated kiosk. Aspects of the invention are described by way of hardware elements. However, it is appreciated that these elements may also be software modules that are executable in a computer. The software modules may be stored on a computer readable medium, including but not limited to a USB drive, CD, DVD, computer-readable memory, tape, diskette, floppy disk, and the like. For instance, aspects of the invention may be embodied in a JAVA-based application or the like that runs in a processor or processors. Further, the terms "CPU" and "processor" are inclusive by nature, including at least one of hardware, software, or firmware. These terms may include a portion of a processing unit in a computer (for instance, in multiple core processing units), multiple cores, a functional processor (as running virtually on at least one of processor or server, which may be local or remote). Further, in network-based gaming systems, the processor may include only a local processor, only a remote server, or a combination of a local processor and a remote server.

It is contemplated that one or more aspects of the invention may be implemented as computer executable instructions on a computer readable medium such as a non-volatile memory, a magnetic or optical disc. Further, one or more aspects of the invention may be implemented with a carrier signal in the form of, for instance, an audio-frequency, radio-frequency, or optical carrier wave.

A gaming machine related to one or more aspects of the invention will be described in detail with reference to drawings based on an embodiment embodying a slot machine. The slot machine 1 of the embodiment has an image display device such as a liquid crystal display for example, and executes games by displaying images of various symbols on the image display device. That is, the slot machine 1 of the embodiment can be implemented as a video slot machine.

In the slot machine 1 related to the embodiment embodying one or more aspects of invention, if a predetermined number or more of progressive marks are displayed in a base game, a progressive chance game will be executed. In the progressive chance game is a selection game. The selectable number of selection items is determined based on bet amount in the base game. In an example shown in FIG. 1, since three of the progressive marks are displayed, the progressive chance game will be executed. Also, since the bet amount is "5" in the base game, the selectable number of the selection items is "5".

Figure 2:
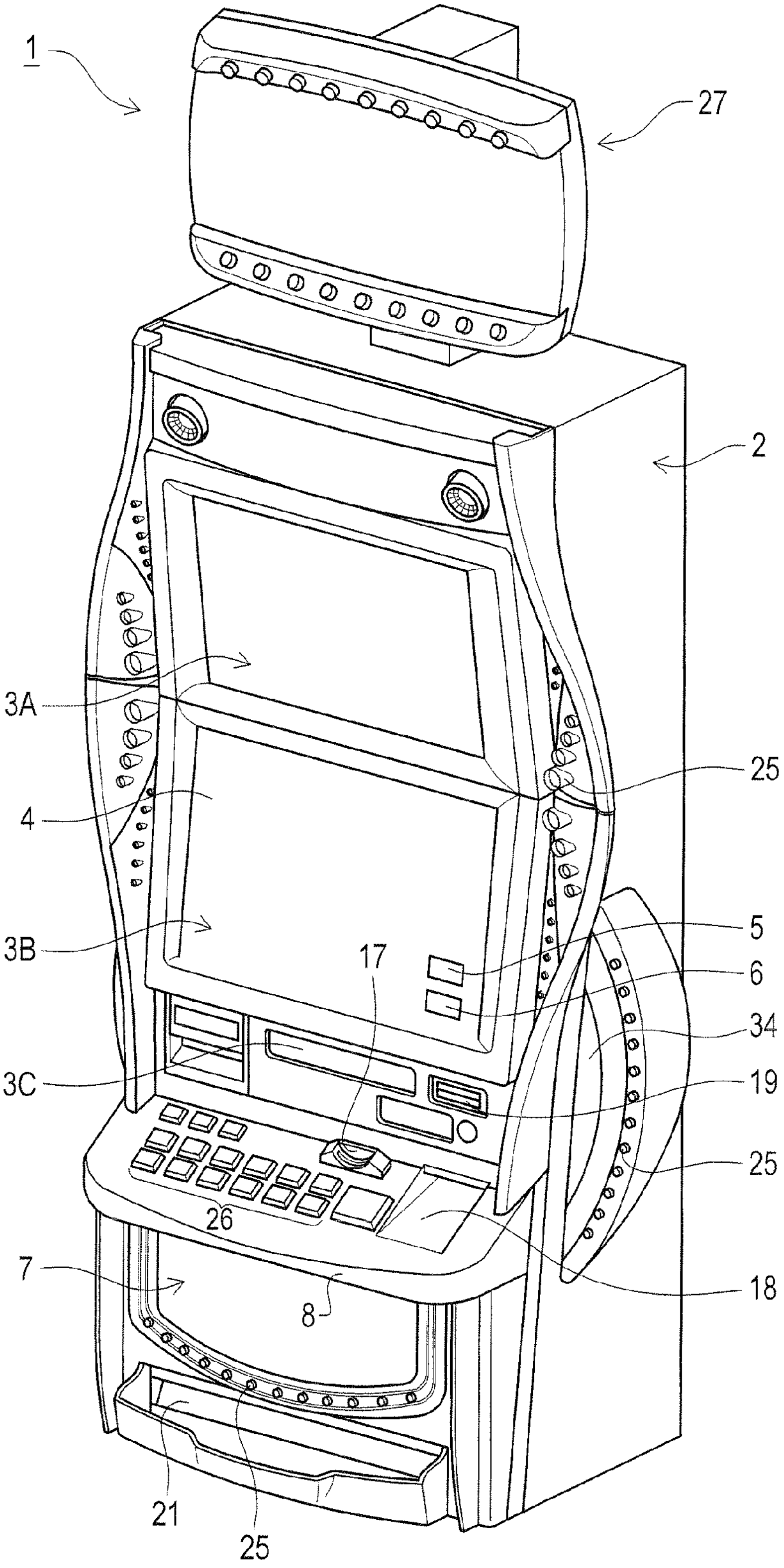
FIG. 2 is a perspective view showing an outer appearance of the slot machine in accordance with one or more aspects of the invention.

A schematic configuration of a slot machine 1 according to the embodiment will be described with reference to FIG. 2. FIG. 2 is a perspective view showing an outer appearance of the slot machine 1 according to the first embodiment.

The slot machine 1 of the embodiment is an upright-type slot machine positioned in a gaming arcade such as a casino or the like. Here, the outer shape of the slot machine 1 of the embodiment shown in FIG. 2 is given as merely one example, and one or more aspects of the invention is not limited to this outer shape.

The slot machine 1 has a cabinet 2. The cabinet 2 is a housing portion that houses electrical or mechanical components which are used in execution of a predetermined game aspect.

An upper display portion 3A, a variably display portion 3B, and an under display portion 3C are arranged in front of the slot machine 1 so as to display different type of game information. The upper display portion 3A is arranged upper side of the cabinet 2, the variably display portion 3B is arranged middle side of the cabinet 2, and the under display portion 3C is arranged lower side of the cabinet 2.

The upper display portion 3A is constructed from a liquid crystal panel. Effects images, payout tables of games, game rules, or the like are displayed on the upper display portion 3A.

Figure 3:
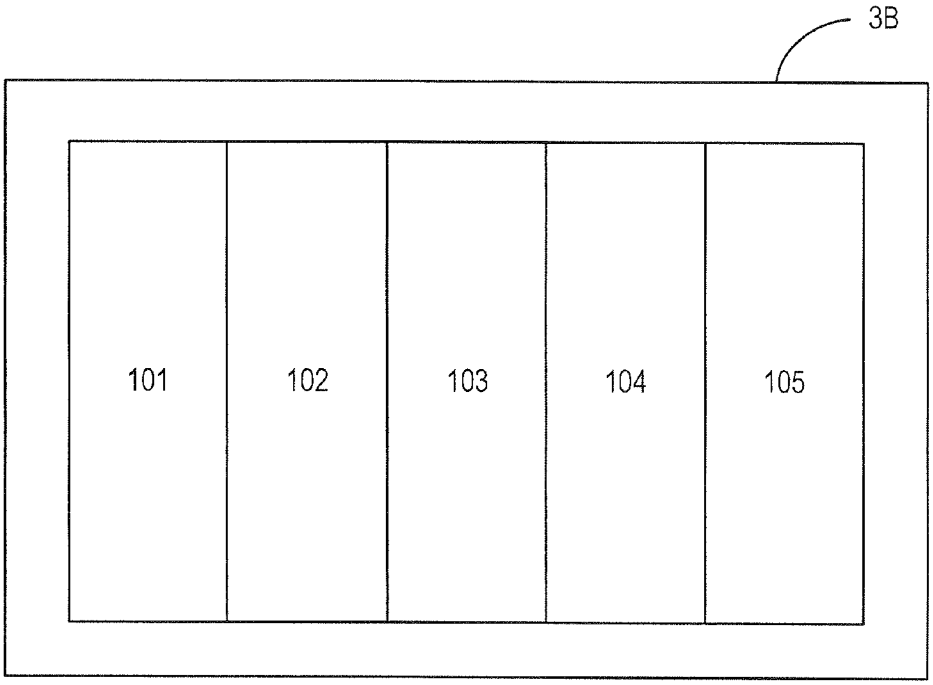
FIG. 3 is a view showing reel display portions of the slot machine in accordance with one or more aspects of the invention.
Figure 4:
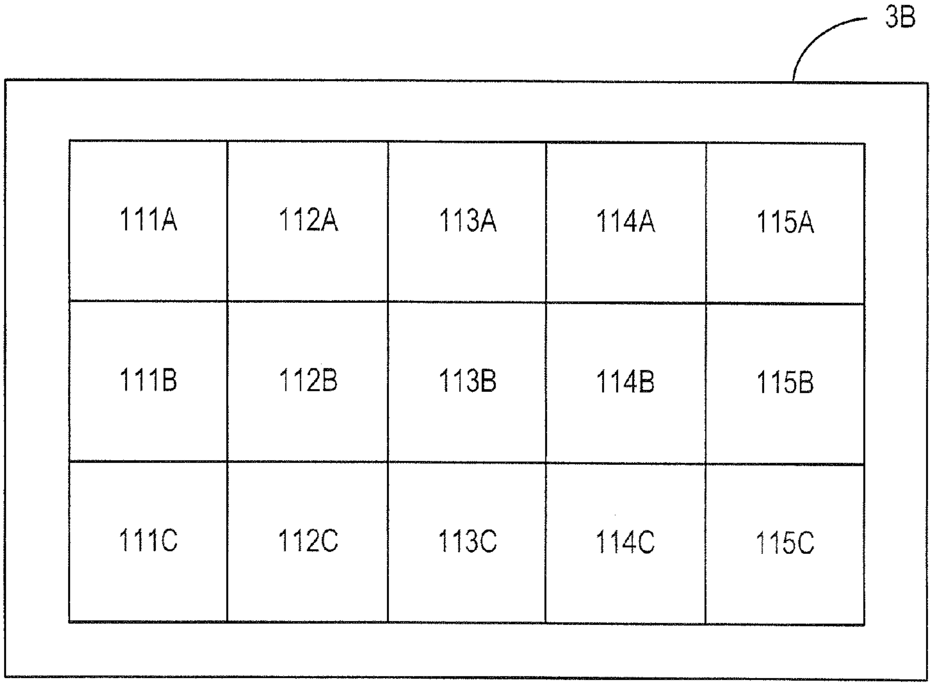
FIG. 4 is a view showing symbol display portions of the slot machine in accordance with one or more aspects of the invention.

The variably display portion 3B is constructed from a liquid crystal panel. The variably display portion 3B has five rows of reel display portions 101 to 105 as shown in FIG. 3, for example. On each of the reel display portions, symbol rows are variably displayed and stopped. On each of the reel display portions 101 to 105, three symbols are displayed respectively. That is, on the variably display portion 3B, as shown in FIG. 4, the symbols are displayed with 3×5 matrix shape. Also, the reel display portions 101 to 105 have symbol display portions 111A to 111C, 112A to 112C, 113A to 113C, 114A to 114C, and 115A to 115C respectively. Also, the number of the reel and the number of displayed symbol per reel display portion are variable.

A touch panel 4 is provided at a front face of the variably display portion 3B. The player can operate the touch panel 4 to input various types of commands. Also, a payout amount display portion 5 and a credit number display portion 6 are arranged on the variably display portion 3B. The displayed position of the payout amount display portion 5 and the credit number display portion 6 are variable. For example, these are displayed on lower right side portion of the variably display portion 3B. Also, a bet number display portion may be arranged so as to display bet number. The payout amount which will be provided to the player (that is, payout amount to be provided when predetermined symbols are displayed with the predetermined number in a base game and accumulated payout amount obtained in free games) are displayed on the payout amount display portion 5. The credit number which the player currently owns is displayed on the credit number display portion 6.

The under display portion 3C is constructed form a liquid crystal panel. Number of points stored in a card and/or number of game points are displayed on the under display portion 3C. Also, when the card is not inserted and/or error of reading the card occurs, message which indicates that is displayed.

Also, a card reader 19 is arranged around the under display portion 3C. The card reader 19 can read information from the card in which the player owns.

The upper display portion 3A, the variably display portion 3B, and the under display portion 3C are constructed from the liquid display for example, however, one or more aspects of the invention is not so limited. That is, each of the variably display portion can be CRT displays, plasma displays, LED displays, or other known display devices.

A lower back panel 7 is arranged lower side of the under display portion 3C and is constructed from plastic panel. Character pictures related to the gaming machine, name of the gaming machine, and the like are displayed and the lower back panel is lit by the backlight. The lower back panel 7 can be CRT displays, plasma displays, LED displays, or other known display devices.

Also, the variably display portion 3B can be hybrid type slot machine which is made up of mechanical reels and transparent liquid crystal display device arranged in front of the mechanical reels. In this case, symbols displayed on the mechanical reels are visible perceived via the transparent liquid crystal display device. Also, it is preferable that display windows whose number is the same as the number of the mechanical reels is arranged on the transparent liquid crystal display device and it is constructed so that symbols displayed on the mechanical reels are visible perceived via the window displays. Here, in following explanation, slot machines using video reels are mainly described, however, naturally, the invention is can be applied to slot machines using mechanical reels within applicable limits. Also, if the mechanical reel is used, spin and stop of the mechanical reel are controlled by the motor (not shown).

An operation table 8 formed by projecting to proximal side is provided at the bottom of the variably display portion 3B. Various operation buttons 26, such as an exchange button, a payout button, a help button, a bet button, and start button or the like, are arranged on the operation table 8. An arrangement of these buttons is variable. Also, a part of the buttons can be omitted, and new button can be added or replaced, as needed. Also, a coin insertion slot 17 and a bill verifier 18 are arranged on the operation table 8.

Also, a coin payout opening and a coin receiving portion 21 is formed on lower portion of the cabinet 2. The coin payout opening is a portion where coins are paid out based on inputs of the exchange button or the payout button. And, the coin receiving portion 21 is a portion where the coins which are paid out from the coin payout opening are received. A coin detection portion made up of sensor or the like is arranged inside the coin payout opening. The coin detection portion detects the number of coins which are paid out from the payout opening.

Light emitting portions 25, which lights up in a predetermined lighting pattern when winning combination is realized and during the free game, are arranged around the cabinet 2 of the slot machine 1. Loudspeakers 34 which outputs audio are arranged at side of the cabinet 2. Here, arranged positions of the light emitting portion 25 and the loudspeaker 34 are variable.

The slot machine 1 has a topper effect device 27 provided at an upper side of the cabinet 2. This topper effect device 27 has a rectangular board shape and is arranged so as to be substantially parallel with the upper display portion 3A. Here, the shape of the topper effect device 27 is variable. Different types of information are displayed on the topper effect device 27.

Figure 5:
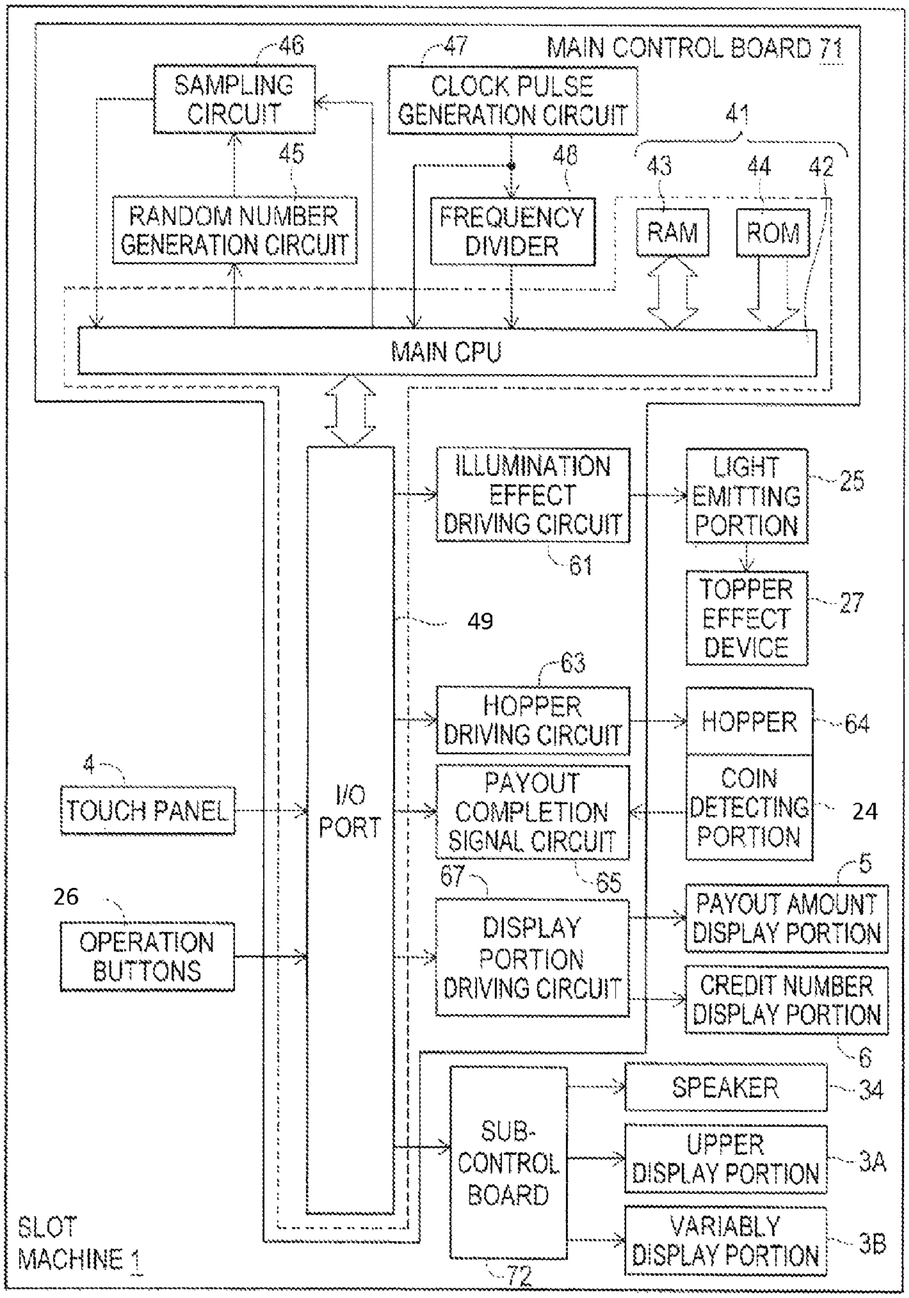
FIG. 5 is a block diagram showing an internal configuration of the slot machine in accordance with one or more aspects of the invention.
Figure 6:
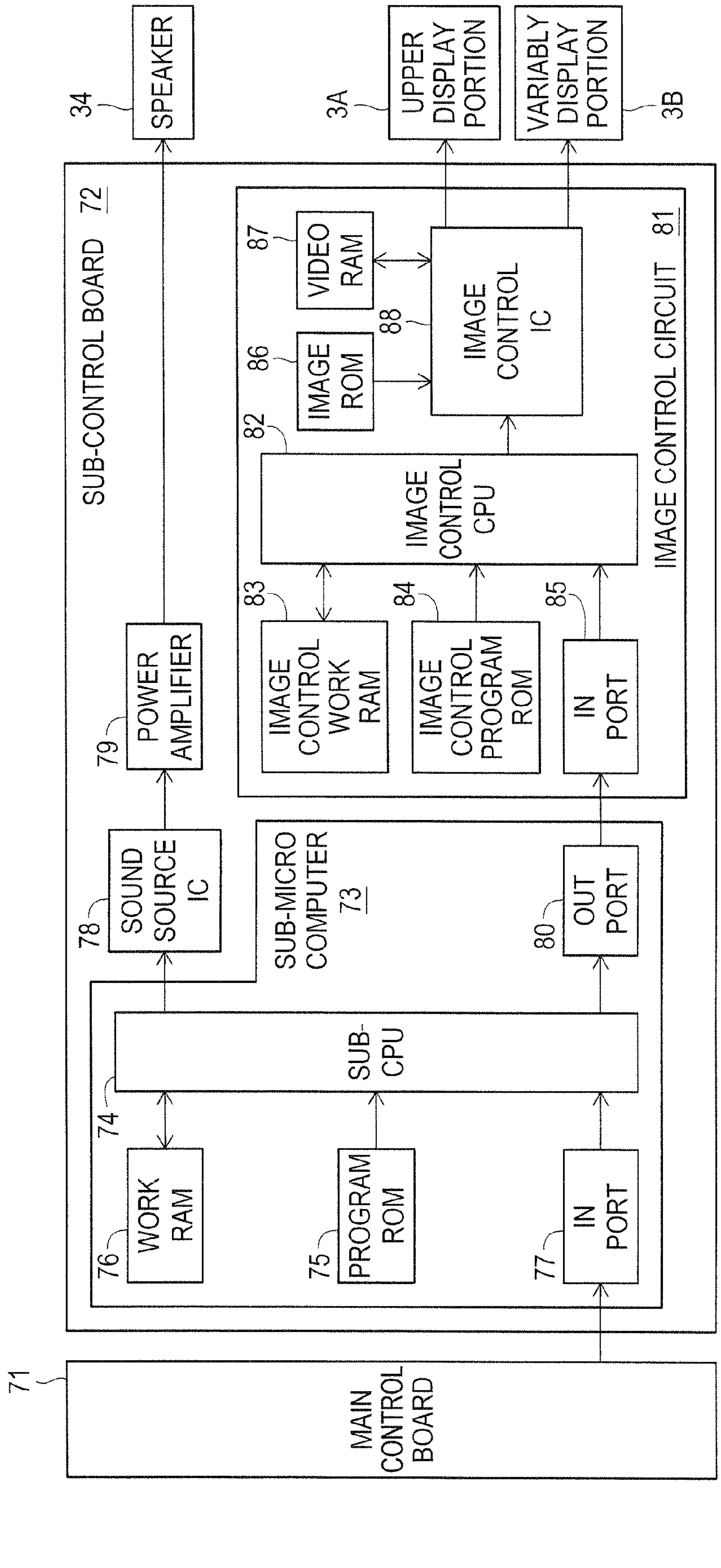
FIG. 6 is a block diagram showing an internal configuration of a sub-control board of the slot machine in accordance with one or more aspects of the invention.

Next, the internal configuration of the above-mentioned slot machine 1 will be described with reference to FIG. 5 and FIG. 6. FIG. 5 is a block diagram showing an internal configuration of the entire slot machine 1. As shown in FIG. 5, the slot machine 1 has a plurality of constituent elements arranged around a main control board 71 including a controller 41 that executes control programs that will be described later. The main control board 71 has a controller 41, a random number generation circuit 45, a sampling circuit 46, a clock pulse generation circuit 47, a divider 48, an illumination effect driving circuit 61, a hopper driving circuit 63, a payout completion signal circuit 65 and a display portion driving circuit 67.

The controller 41 has a main CPU 42, a RAM 43 and a ROM 44. The main CPU 42 operates in accordance with the programs stored in the ROM 44 and performs signal input and output with respect to the other constituent elements through an I/O port 49. Specifically, the main CPU 42 controls the operation of the entire slot machine 1. The RAM 43 stores data and programs to be used when the main CPU 42 is operating. For instance, the RAM 43 temporarily retains the random number values which have been sampled by the sampling circuit 46 after the game has started. The RAM 43 stores code numbers corresponding to the respective reels 101 through 105. The ROM 44 stores various types of programs that will be executed by the main CPU 42, as well as permanent data.

More particularly, the programs stored in the ROM 44 include game programs and game system programs (hereinafter referred to as game programs or the like). Further, the game programs include lottery programs as will be described later.

The lottery programs are used to determine the code numbers corresponding to symbols to be displayed on center positions of each reel display portion 101 to 105, namely, symbol display portion "111B, 112B, 113B, 114B, and 115B" of the variably display portion 3B. Correspondence relationships between the code numbers and the symbols will be described later.

The random number generation circuit 45 operates in accordance with the commands from the main CPU 42 and generates random numbers within a predetermined range. The sampling circuit 46 selects, by lottery, an arbitrary random number from the random numbers generated by the random number generation circuit 45 in response to a command from the main CPU 42. At the same time, the sampling circuit 46 inputs the random number thus selected to the main CPU 42. The clock pulse generation circuit 47 generates a reference clock for causing the main CPU 42 to operate. The divider 48 inputs a signal obtained by dividing the reference clock by a constant frequency to the main CPU 42.

The main control board 71 is connected to the touch panel 4. As described above, the touch panel 4 is arranged at a front face of the variably display portion 3B and is adapted to identify a coordinate position of the portion that was touched by the player. Specifically, the touch panel 4 can discriminate the portion that the player has touched, and in what direction the touched portion was moved based on the coordinate position information that was thus identified. A signal in accordance with the above discrimination is then inputted to the main CPU 42 through the I/O port 49.

The main control board 71 is connected to the operation button 26 (the start button and the like, as mentioned above) and a signal in accordance with a depression operation of these buttons is inputted to the main CPU 42 through the I/O port 49.

The illumination effect driving circuit 61 outputs an effect signal for causing the light emitting portions 25 and the topper effect device 27 as mentioned above to perform illumination effects. The topper effect device 27 is connected in series with the illumination effect driving circuit 61 through the light emitting portions 25.

The hopper driving circuit 63 drives the hopper 64 under the control of the main CPU 42. As a result, the hopper 64 carries out an operation to payout coins to the coin payout opening. The payout completion signal circuit 65 receives coin amount value data from the coin detecting portion 24 to which it is connected. Then, when the received coin amount value has reached the set coin amount value, the payout completion signal circuit 65 inputs a signal that notifies completion of coin payout to the main CPU 42. The coin detecting portion 24 detects the number of coins that were paid out by the hopper 64 and then inputs coin amount value data showing the amount of coins that was detected to the payout completion signal circuit 65. The display portion driving circuit 67 controls the display operation of the respective display portions including the payout amount display portion 5, the credit number display portion 6, and the like.

The main control board 71 is connected to the sub-control board 72. As shown in FIG. 6, the sub-control board 72 carries out display control of each of the display portion and output control of the audio outputted by the loudspeaker 34, based on the commands received from the main control board 71. This sub-control board 72 is constituted on a separate circuit board from the circuit board that constitutes the main control board 71. The sub-control board 72 has a micro computer (hereinafter referred to as "sub-micro computer") 73 which is provided as a main constituting element. Then, the sub-control board 72 has a sound source IC 78, a power amplifier 79, and an image control circuit 81. The sound source IC 78 controls the audio output from the loudspeaker 34. The power amplifier 79 functions as an amplifier. The image control circuit 81 operates as a display control section for the upper display portion 3A and the variably display portion 3B.

The sub-micro computer 73 has a sub-CPU 74, a program ROM 75, a work RAM 76 and I/O ports 77 and 80. The sub-CPU 74 carries out a control operation in accordance with a control command transmitted from the main control board 71. Although the sub-control board 72 does not have a clock pulse generation circuit, a divider, a random number generation circuit and a sampling circuit, it is constituted so as to execute sampling of random numbers based on an operation program of the sub-CPU 74. The program ROM 75 stores a control program to be executed by the sub-CPU 74. The work RAM 76 is constituted as a temporary memory to be used by the sub CPU 74 in executing the control program.

The image control circuit 81 has an image control CPU 82, an image control work RAM 83, an image control program ROM 84, an in port 85 an image ROM 86, a video RAM 87 and an image control IC 88. The image control CPU 82 determines the image to be displayed on the upper display portion 3A and the variably display portion 3B based on the parameters set in the sub-micro computer 73 and the image control programs stored in the image control program ROM 84. For example, the upper display portion 3A displays a payout table and a help screen. The variably display portion 3B carries out scrolled display and stopped display on the respective symbol display portions 111A to 111C, 112A to 112C, 113A to 113C, 114A to 114C, and 115A to 115C.

The image control program ROM 84 stores an image control program and various types of selection tables relating to display on the upper display portion 3A and the variably display portion 3B. The image control work RAM 83 functions as a temporary memory to be used in execution of the image control program in the image control CPU 82. The image control IC 88 forms an image in accordance with the contents determined by the image control CPU 82 and then outputs the image thus formed to the upper display portion 3A and the variably display portion 3B.

The image ROM 86 stores dot data for forming an image. The video RAM 87 functions as a temporary memory to be used by the image control IC 88 in forming an image.

Here, the internal construction of the slot machine 1 as mentioned above is merely one example and one or more aspects of the invention is not so limited. For example, memory card and/or PLD (Programmable Logic Device) may be detachably from the slot machine 1 and necessary information may be read from the memory card and/or the PLD.

The slot machine 1 of the first embodiment employs coins, bills or electronic value information (credit) corresponding to these, as gaming values. The gaming values applicable to the invention are not limited to those described above, and can include, for instance, medals, tokens, electronic money and tickets.

Figure 7:
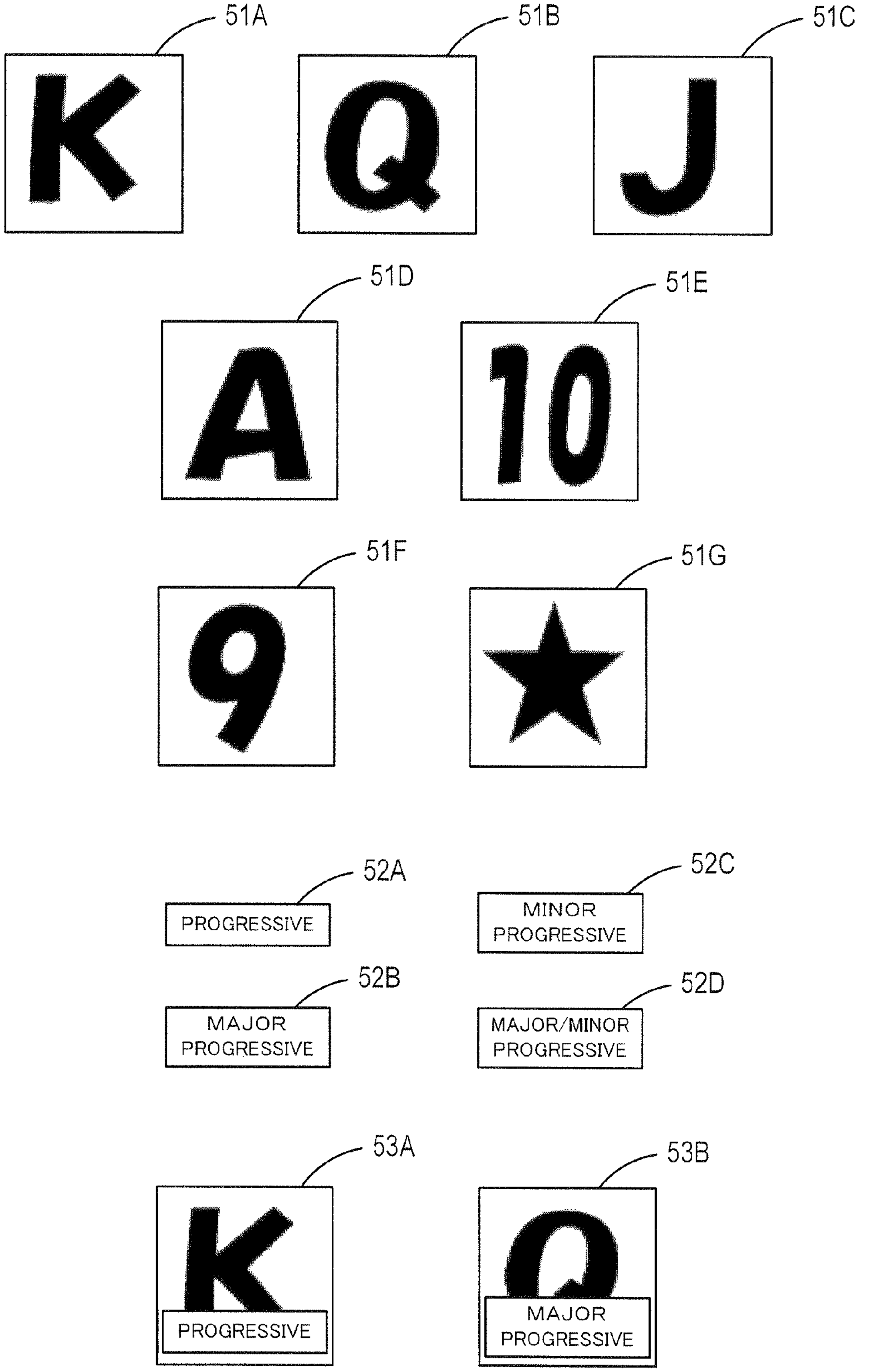
FIG. 7 is a view showing symbols and marks displayed on each reel of the slot machine in accordance with one or more aspects of the invention.

Next, the symbols which are variably displayed on the symbols display portion will be described with reference to FIG. 7. FIG. 7 is a view schematically showing the symbols displayed on the reels which are variably displayed on the reel display portions 101 to 105.

Symbols displayed on the reel are divided into a first symbol group and a second symbol group. First symbols are symbols belonging to the first symbol group. The first symbols include the KING symbol 51A, QUEEN symbol 51B, JACK symbol 51C, ACE symbol 51D, TEN symbol 51E, NINE symbol 51F, and STAR symbol 51G.

Also, the second symbols are symbols belonging to the second symbol group. Each of the second symbols is made up of the first symbol and a specific mark (progressive mark).

That is, if the first symbol has the specific mark, it will be the second symbol. Concretely, as shown in FIG. 7, the second symbol 53A includes the KING symbol 51A having a mark 52A ("PROGRESSIVE MARK"), and the second symbol 53B includes the QUEEN symbol 51B having a mark 52B ("MAJOR-PROGRESSIVE MARK"). Here, the second symbol 53A and the second symbol 53B are merely examples of the second symbols. Also, marks include a mark 52C ("MINOR-PROGRESSIVE MARK") and a mark 52D ("MAJOR/MINOR-PROGRESSIVE MARK"). Here, details of marks 52A through 52D will be described later.

The number of the symbols which are displayed on one reel is variable and the type of the displayed symbols is variable.

Figure 9:
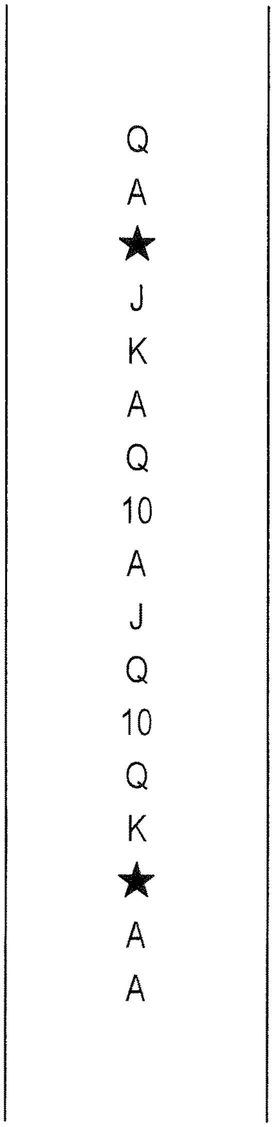
FIG. 9 is a view showing symbol rows displayed on each reel of the slot machine in accordance with one or more aspects of the invention.

FIG. 8 through FIG. 10 show examples of reel variably displaying on each of the reel display portions. As shown in FIG. 8 through 10, a part or all of symbols shown in FIG. 7 are displayed on the reel in a predetermined order. In FIG. 8, "K(P)" is a second symbol having the KING symbol 51A and the mark 52A. Also, in FIG. 8, "Q(P)" is a second symbol having the QUEEN symbol 51B and the mark 52A.

In FIG. 10, "K(P_MA)" is a second symbol having the KING symbol 51A and the mark 52B. Also, "K(P_MI)" is a second symbol having the KING symbol 51A and the mark 52C. Further, "K(P_MAMI)" is a second symbol having the KING symbol 51A and the mark 52D.

As shown in FIG. 8 and FIG. 10, the second symbol is displayed on the first reel and the third reel. Also, as shown in FIG. 9, the second symbol is not displayed on the second reel.

In the embodiment, the first reel shown in FIG. 8 is used in the reel display portion 101 and the reel display portion 103. The second reel shown in FIG. 9 is used in the reel display portions 102 and 104. The third reel shown in FIG. 10 is used in the reel display portion 105. Accordingly, the second symbol can be stopped on the reel display portions 101, 103, and 105. Also, the second symbol will not bet stopped on the reel display portions 102 and 104. Also, correspondence relationship between the reel display portion and the reel to be used is one example. Also, one or more aspect of the invention can be implemented on another correspondence relationship.

Next, games executed in the slot machine 1 of the embodiment will be described. The games executed in the embodiment are constructed from three of games. The three of games are the base game, the free game, and the progressive chance game. Since the progressive chance game will be described later, the base game and the free game will be described.

At first, the base game will be described. In the base game, all of the symbols to be displayed on the symbol display portions are scatter symbol. The base game is a game in which an award is provided based on the combination of the symbols on the payline which is set on the symbols display portions 111A to 111C, 112A to 112C, 113A to 113C, 114A to 114C, and 115A to 115C with 3×5 matrix (namely, matrix in 3 rows and 5 columns) shape on the variably display portion 3B.

Figure 11:
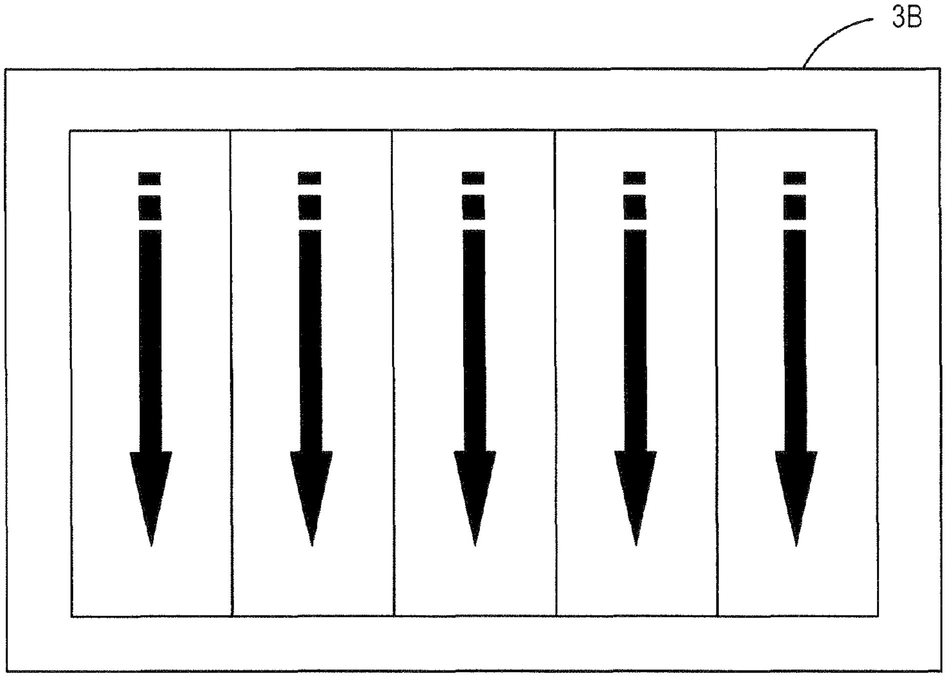
FIG. 11 is a view showing a condition where reels are variably displayed on variably display portions of the slot machine in accordance with one or more aspects of the invention.
Figure 12:
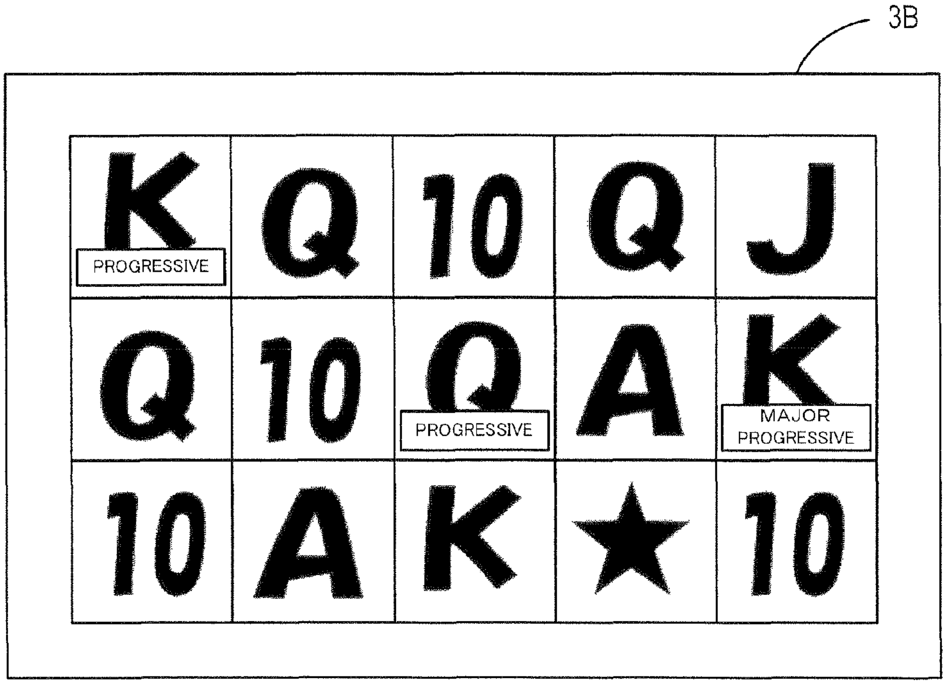
FIG. 12 is a view showing a condition where symbols are stopped displayed on variably display portions of the slot machine in accordance with one or more aspects of the invention.

When the bet count is determined based on the operation of the bet button, and then the start button is input, the reels start to spin on the each of the reel display portions 101 to 105. Accordingly, the symbol rows displayed on the reel are scrolled from top to bottom, as shown in FIG. 11. After a predetermined time, the reels are stopped displayed on the reel display portions 101 to 105. Accordingly, a part of the symbol rows of the reel (total of fifteen symbols which three symbols on each reel display portion 101 to 105) are displayed in the symbol display portion on the variably display portion 3B respectively, as shown in FIG. 12. Here, scroll direction can be from the bottom to top not limited to from top to bottom. Also, the scroll direction can be different on each reel display portion. Also, the scroll direction can be different on each game.

Also, in the embodiment, at first, the reel on the reel display portion 101 is stopped. Next, the reel on the reel display portion 102 is stopped. After that, the reel on the reel display portion 103, the reel on the reel display portion 104, and the reel on the reel display portion 105 are stopped in that order.

In the base game, winning combination is determined based on the number of the same symbols and an award corresponding to the determined winning combination will be provided. If the winning combination is realized, amount of outcome, which the payout number corresponding to the winning combination is multiplied by the bet number, is provided to the player.

Also, the slot machine 1 in the embodiment has plural jackpots. Concretely, MAJOR jackpot and MINOR jackpot are provided. Also, a portion (for example, 1%) of the bet amount which bet in the base game is accumulated. Here, accumulation method for plural jackpots is variable. For example, portions of bet amount can be different in each of jackpots. Also, a starting value of the MAJOR jackpot is larger than a starting value of the MINOR jackpot.

If the MAJOR progressive bonus (which will be described later) is realized, credit amount corresponding to the jackpot amount of the MAJOR jackpot will be provided. Also, if the MINOR progressive bonus (which will be described later) is realized, credit amount corresponding to the jackpot amount of the MINOR jackpot will be provided.

Next, the free game will be described. The free game is executed if a predetermined number (for example, three) or more of the scatter symbols (in the embodiment, the star symbols 45G) are displayed on the symbol display portions 111A to 111C, 112A to 112C, 113A to 113C, 114A to 114C, and 115A to 115C. Here, with respect to the procedure of the free game, the free game is the same as the base game, except that in the free game, gaming values (credits) corresponding to the bet amount are not consumed at the start of the game, and the game is continuously carried out automatically without requiring the player to operate the operation button.

Figures 13, 14:
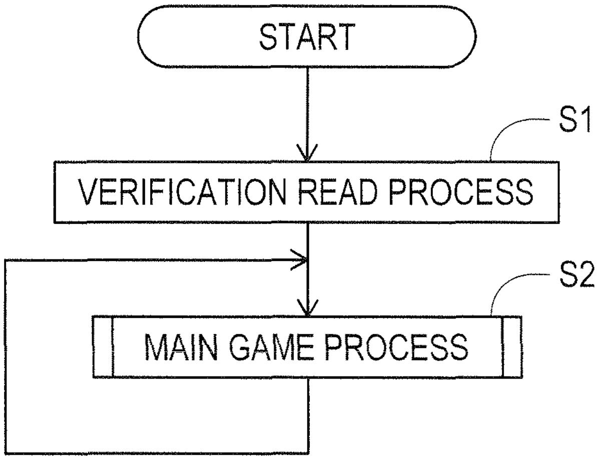
FIG. 13 is a view showing contents of payout table of the slot machine in accordance with one or more aspects of the invention.
FIG. 14 is a flowchart of a main control process in the slot machine in accordance with one or more aspects of the invention.

The winning combination and payout number thereof used in the base game and the free game in the slot machine 1 of the embodiment will be described with reference to FIG. 13. FIG. 13 shows payout table which indicates the winning combination and payout number thereof used in the base game and the free game.

FIG. 13 indicates the payout number in the case where the bet count is "1". If the bet count is "1", the payout number shown in FIG. 13 will be provided. If the bet count is more than "1", the payout number shown in FIG. 13 will be multiplied by the bet count, and multiplied number will be provided. Here, the bet count in the free game is the same as the bet count of the latest base game.

For example, if five of KING symbols 51A are displayed on the symbol display portions 111A to 111C, 112A to 112C, 113A to 113C, 114A to 114C, and 115A to 115C, amount of outcome which 250 credit is multiplied by the bet number will be provided to the player.

Also, if four of ACE symbols 51D are displayed on the symbol display portions 111A to 111C, 112A to 112C, 113A to 113C, 114A to 114C, and 115A to 115C, amount of outcome which 15 credit is multiplied by the bet number will be provided to the player.

In a similar way, the payout numbers are defined on each of the winning combinations shown in FIG. 13. Here, the combination on the payline not associated with any of the winning combinations shown in FIG. 13 is realized, the game is lost. If the game is lost, none of the payout number will be paid.

Also, if the second symbol is displayed (see FIG. 12), the payout amount is determined based on the first symbol and the mark included in the second symbol. For example, in the example of FIG. 12, the payout amount is determined based on the three of the KING symbols 51A and four of the QUEEN symbols 51B.

Here, the payout table shown in FIG. 13 is merely on example and type of the winning combinations and payout number can be set arbitrarily. Also, plural payout tables are provided and the plural payout tables are selected based on the payout rate which is set.

Next, a main control program executed in the slot machine 1 of the embodiment will be described in detail with reference to drawings. FIG. 14 is a flowchart of the main control program.

First, when the power switch is turned on (upon power on), the main control board 71 and the sub-control board 72 are activated, and the controller 41 executes an initial setting process at step (hereinafter referred to as S) S1. In the verification read process, the main CPU 42 executes the BIOS stored in the ROM 44 and e that was expanded in the RAM 43, the main CPU 42 carries out a diagnosis and initialization of the different types of peripheral devices. Further, the main CPU 42 writes the game programs and the like from the ROM 44 into the RAM 43 to acquire payout rate setting data and country identification information. While executing the initial setting process, the main CPU 42 also carries out an authentication process with respect to each program.

Then, at S2, the main CPU 42 sequentially reads the game programs and the like from the RAM 43 and executes these programs to carry out a main game process. The slot machine 1 according to the embodiment carries out the game by executing this main game process. The main game process is repeatedly executed while power is supplied to the slot machine 1.

Figure 15:
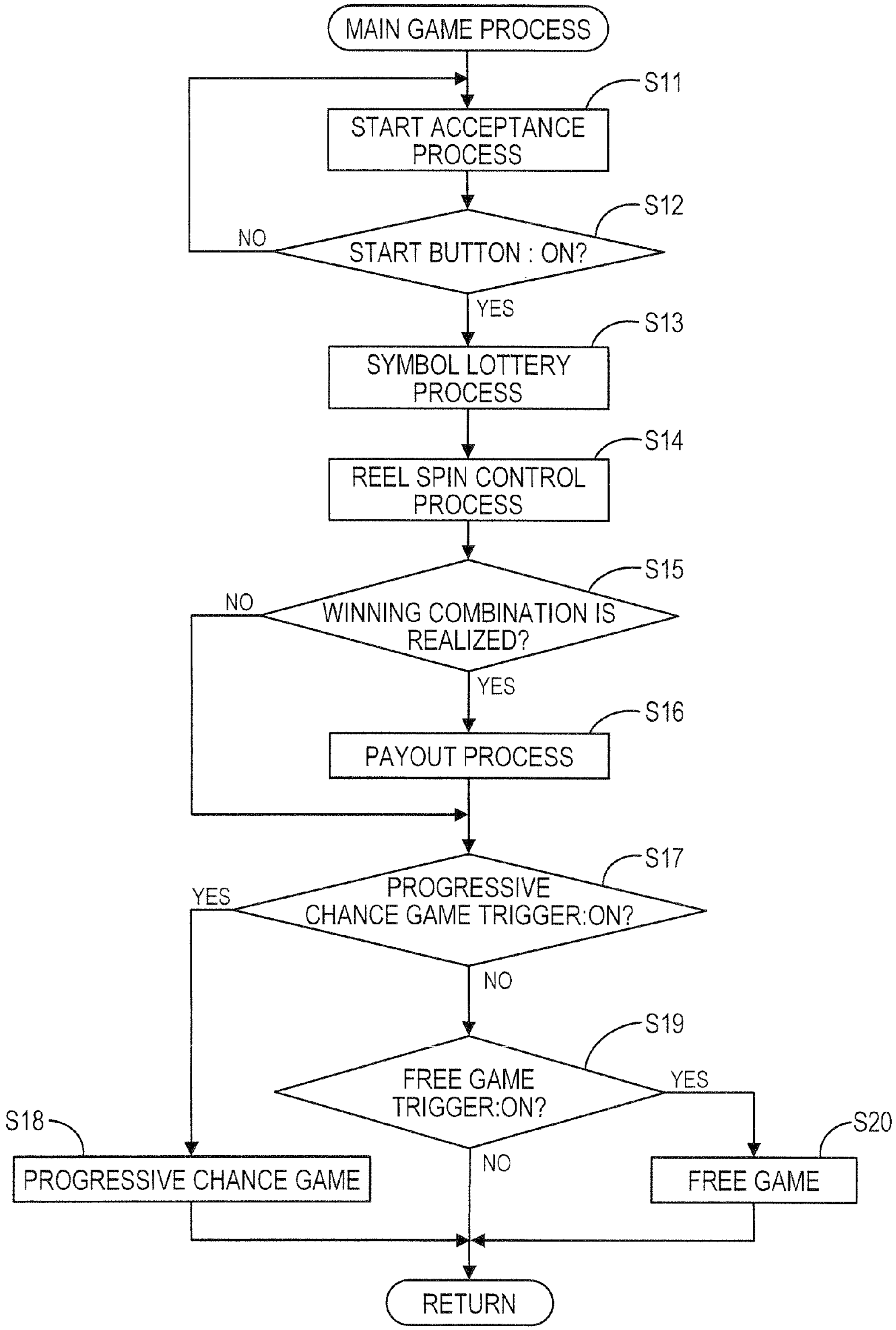
FIG. 15 is a flowchart of a main game process in the slot machine in accordance with one or more aspects of the invention.

Next, a sub-process of the main game process at the above-described S2 will be described based on FIG. 15. FIG. 15 is a flowchart of the main game process program to be executed in the slot machine 1 according to the embodiment. The program shown in the flowchart of FIG. 15 is stored in the ROM 44 and RAM 43 provided in the slot machine 1 and are executed in the main CPU 42.

The main CPU 42 first executes a start acceptance process at S11. In the start acceptance process, the player inserts coins and places a bet using the BET button from amongst the operation buttons 26.

At S12, the main CPU 42 determines whether or not the start button from amongst the operation buttons 26 has been depressed. This determination is carried out based on the signal inputted to the main CPU 42 in response to depression of the start button. That is, at S12, it is determined whether or not the start button is pressed. Here, if the start button has not been depressed (S12: NO), the flow returns to the start acceptance process (S11). As a result, the player can carry out an operation to correct, etc. the bet amount. Alternatively, if the start button has been depressed (S12: YES), the main CPU 42 subtracts the bet amount set based on the above-described bet operation from the credit amount that the player currently possesses and at the same time stores the result as bet information in the RAM 43. After that, the procedure will be shifted to S13.

In S13, the symbol lottery process is executed. Concretely, the main CPU 42 samples random number value from a number value range within a predetermined random number value range by executing the lottery program store in the RAM 43, and determines symbols to be stopped on center positions of each reel display portion 101 to 105 (namely, symbol display portions "111B, 112B, 113B, 114B, and 115B") based on the sampled random number values and the table.

Here, a process of S13 will be described in detail. FIG. 16 shows one example of a table in which symbols displaying on the reel shown in FIG. 8 correspond to code numbers. Each of reel display portions has the table. FIG. 17 shows one example of a table in which the random number values corresponds to the code numbers. The code numbers are determined with the use of the table shown in FIG. 17 based on the sampled random number values among predetermined random number range (for example, from 0 to 65535). The symbols to be stopped are determined with the use of the determined code numbers and the table shown in FIG. 16.

Here, as shown in FIG. 17, since the number of random number values corresponding to each code number is different, each of probabilities of appearance of each symbol shown in FIG. 16 is controlled. For example, in FIG. 17, code number "4" corresponds to random number values "512" to "760", code number "5" corresponds to "761" to "767". Therefore, in FIG. 16, since the code number "4" may more appear than the code number "5", TEN symbol 51E corresponding to the code number "4" may more appear than the NINE symbol 51F corresponding to the code number "5".

For example, with respect to the reel display portion 101, in a case where reel shown in FIG. 16 is used and "1136" is sampled, it is determined that code number is "08" based on the table shown in FIG. 17. And then, it is determined that the KING symbol 51A corresponding to the code number "08" will be displayed on the symbol display portion 111B with the use of the table shown in FIG. 16.

Also, as shown in FIG. 18, the random number values to be sampled may correspond to symbols.

Returning to FIG. 15, in S14, the main CPU 42 carries out a reel spin control process. Specifically, the main CPU 42 variably displays each of the reels on the reel display portions 101 to 105. After that, the main CPU 42 determines effects pattern (image display pattern of the variably display portion 3B, sound output pattern of the loudspeaker 34, or the like) in a unit game and send predetermined signal to sub-control board 72 so as to start effects based on the determined effects pattern. Here, the unit game means a sequence of process where each of the reels starts to variably display and then the entire reels are stopped displayed.

Then, after the lapse of a predetermined period of time, reels are stopped to spin on the reel display portions 101 to 105 in predetermined order. Therefore, symbols are stopped displayed on symbol display portions 111A to 111C, 112A to 112C, 113A to 113C, 114A to 114C, and 115A to 115C. As mentioned above, in the embodiment, at first, the reel on the reel display portion 101 is stopped. Next, the reel on the reel display portion 102 is stopped. After that, the reel on the reel display portion 103, the reel on the reel display portion 104, and the reel on the reel display portion 105 are stopped in that order.

Here, with respect to the stops of the spinning reels on the reel display portions, the entire reel can be stopped at once or each of the reels can be stopped in turn.

Here, the symbol determined at S13 is stopped on the symbol display portion 111B. For example, the JACK symbol 51C (code number: 9) which was determined in S13 is stopped on the symbol display portion 111B. In this case, the KING symbol 51A (code number: 8) is displayed on the symbol display portion 111A, and the TEN symbol 51E (code number: 10) is displayed on the symbols display portion 111C.

After that, at S15, the main CPU 42 determines whether or not the symbols arranged on the variably display portion 3B correspond the winning combination. That is, it is determined whether or not the winning combination is realized. This determination is performed based on the code numbers of each reel display portion 101 to 105 stored in the RAM 43.

At a result, if it is determined that the winning combination is realized (S15:YES), the procedure will be shifted to S16. On the other hand, if it is determined that none of the winning combinations is not realized (S15:NO), the procedure will be shifted to S17.

At S16, the main CPU 42 provides the payout number corresponding to the winning combination which is determined at S15 to the player. That is, the payout process is executed. After that, the procedure will be shifted to S17.

At S17, it is determined whether or not the progressive chance game trigger is ON. This determination is based on whether or not a predetermined number (for example, three) or more of the marks displayed on the symbol display portions.

Figure 19:
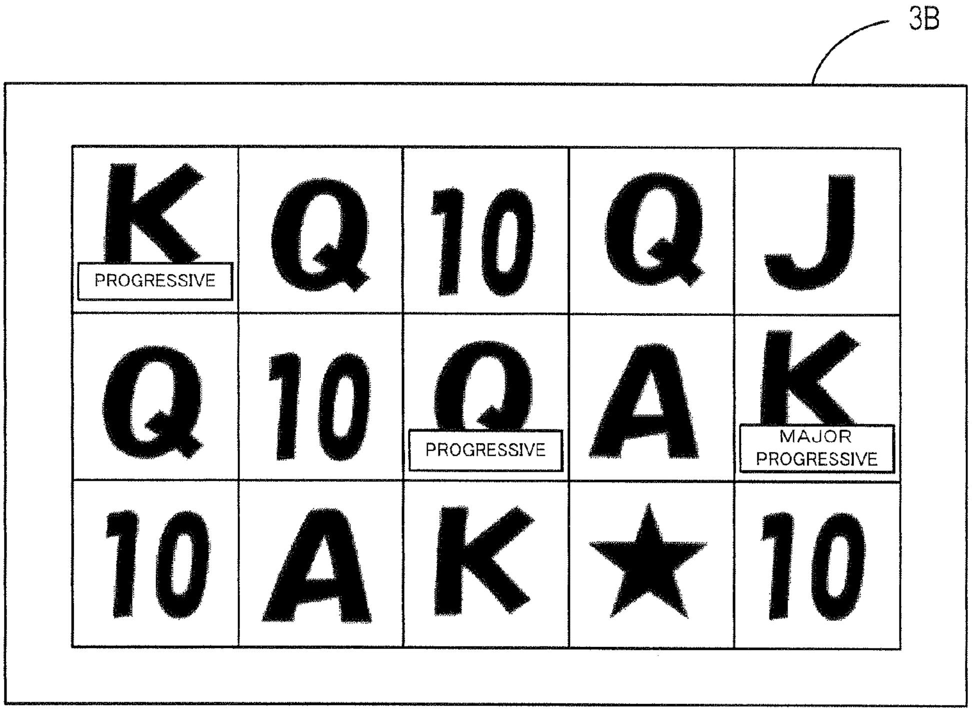
FIG. 19 is a view showing a condition where symbols are stopped on variably display portions of the slot machine in accordance with one or more aspects of the invention.

Also, in this process, the number of the marks is counted regardless of the first symbol. For example, in FIG. 19, since two of the marks are displayed on the KING symbols 51A and one of the mark is displayed on the QUEEN symbol 52B, it is determined that three of the marks are displayed.

Explanation is returned to FIG. 15. At S17, it is determined whether or not the progressive chance game trigger is realized. If it is determined that the progressive chance game trigger is ON (S17:YES), the procedure will be shifted to S18.

At S19, it is determined whether or not the free game trigger is ON. This determination is based on whether or not the predetermined number or more of the specific symbols are displayed. If it is determined that the free game trigger is realized (S19:YES), the procedure will be shifted to S20. At S20, the free game is executed. Details of the free game will be omitted.

On the other hand, if it is determined that the free game trigger is not realized (S19:NO), the main game process is terminated. In the flowchart shown in FIG. 15, if free game trigger is realized, it is not determined whether or not the progressive chance trigger is realized because the symbols are arranged on the reel so as not to the progressive chance game trigger and the free game trigger are not realized at same time.

Also, if symbols of the reel are arranged so that the progressive chance game and the free game can be realized at the same game, process of different flowchart from the flowchart of FIG. 15 is executed. Concretely, process, which the procedure is shifted to S19 after the process of S18 shown in FIG. 18, is executed.

The progressive chance game will be described. In the embodiment, plural progressive chance games exist. In the embodiment, MAJOR progressive chance game and MINOR progressive change game exist. In the MAJOR progressive chance game, jackpot amount corresponding to the MAJOR jackpot can be obtained. Also, in the MINOR progressive chance game, jackpot amount corresponding to the MINOR jackpot can be obtained.

The number of kinds of the progressive chance games may be three. For example, MEGA progressive chance game may exist. In this case, MAGA jackpot corresponding to the MEGA progressive chance game may exist.

Figure 20:
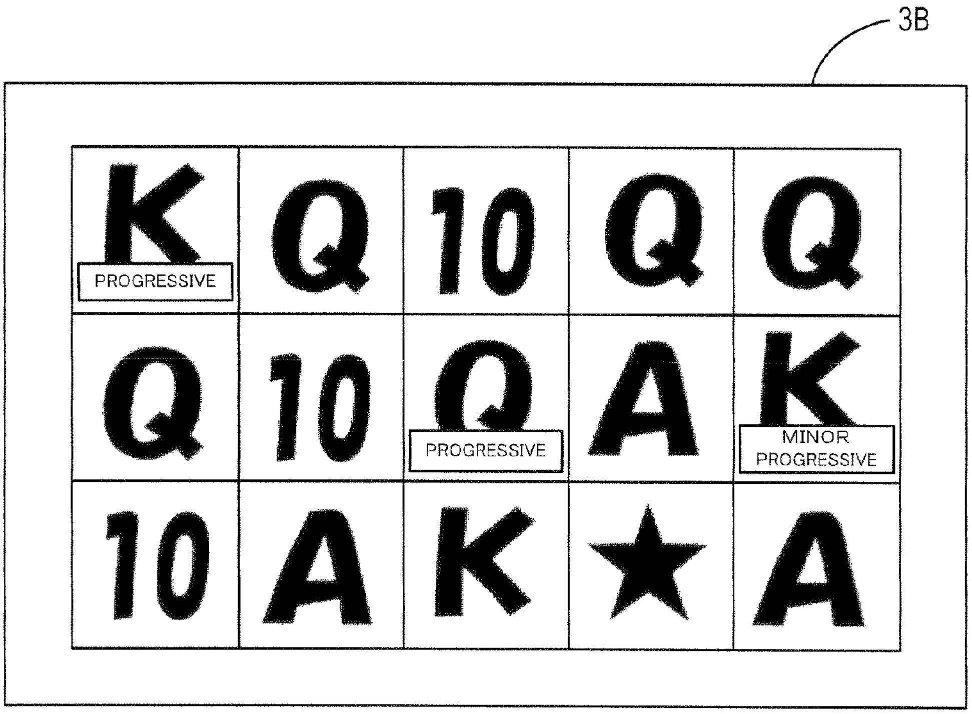
FIG. 20 is a view showing a condition where symbols are stopped on variably display portions of the slot machine in accordance with one or more aspects of the invention.
Figure 21:
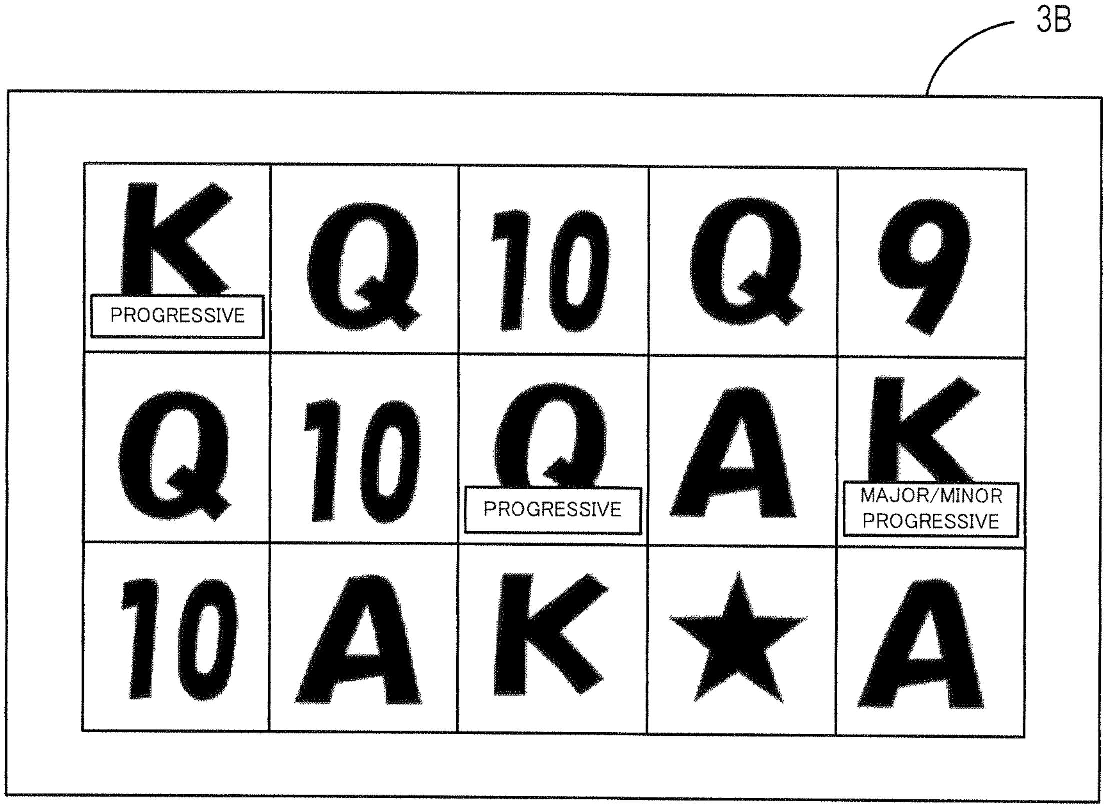
FIG. 21 is a view showing a condition where symbols are stopped on variably display portions of the slot machine in accordance with one or more aspects of the invention.

The progressive chance game to be executed is determined based on the display pattern of the symbol display portion in the base game. Concretely, if the mark 52B is displayed (see FIG. 12), the MAJOR progressive chance game will be executed. Also, if the mark 52C is displayed (see FIG. 20), the MINOR progressive chance game will be executed. Also, if the mark 52D is displayed (see FIG. 21), the MAJOR progressive chance game or the MINOR progressive chance game will be executed. Here, it is determined which progressive chance game can be executed by lottery.

Also, the progressive chance game to be executed is determined based on the bet amount. In this case, for example, if the bet amount in the base game is a predetermined amount and above, the MAJOR progressive chance game will be executed. Also, if the bet amount in the base game is less than the predetermined amount, the MINOR progressive chance game will be executed.

Also, the probability of execution of the MAJOR progressive chance game and the probability of execution of the MINOR progressive chance game can be variable. For example, if the bet amount is predetermined amount and above, the probability of execution of the MAJOR progressive chance game may be 70% and the probability of execution of the MINOR progressive chance game may be 30%. Also, if the bet amount is less than the predetermined amount, the probability of execution of the MAJOR progressive chance game may be 60% and the probability of execution of the MINOR progressive chance game may be 40%. Here, above probabilities are merely example, and these probabilities is parameters which can be set arbitrarily.

Next, details of the progressive chance game will be described. Hereinafter, the MAJOR progressive chance game will be described. Here, the MAJOR progressive chance game and the MINOR progressive chance game are different in jackpot to be won, however, basic game procedures are the same.

The progressive chance game is a selection type game. In the embodiment, plural selection items are displayed on the variably display portion 3B, and an award corresponding to the selected selection item by the player is provided. Here, the award to be provided includes providing predetermined amount of credits and winning for the progressive bonus. Correspondence relationships between the displayed selection item and the award to be provided is determined by lottery when the game mode is shifted to the progressive chance game is shifted.

Figure 22:
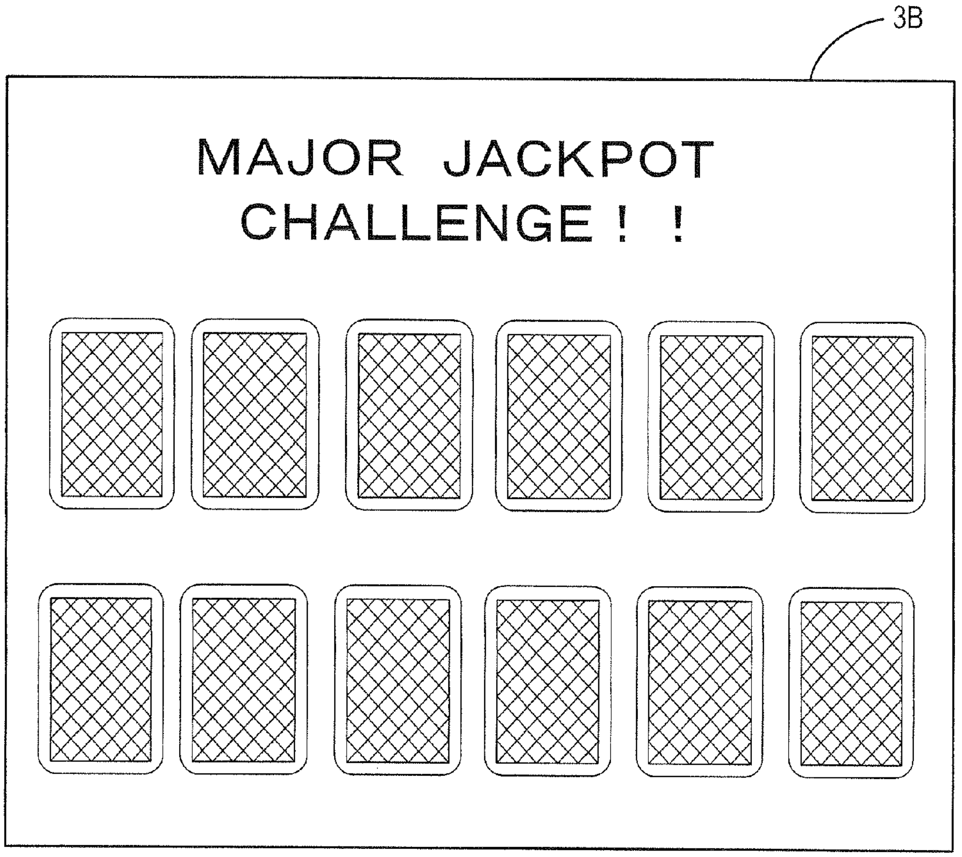
FIG. 22 is a view showing one example of a MAJOR progressive chance game in the slot machine in accordance with one or more aspects of the invention.

FIG. 22 is an example of a screen of the MAJOR jackpot chance game. In the embodiment, twelve of the cards are displayed as selection items. The player can select the selection item by the touch panel 4. If the card is selected, the card is turned up. That is, the card is displayed with the back side when the game mode is shifted to the jackpot chance game is shifted. Accordingly, contents of the award corresponding to the selection items are invisible.

Figure 23:
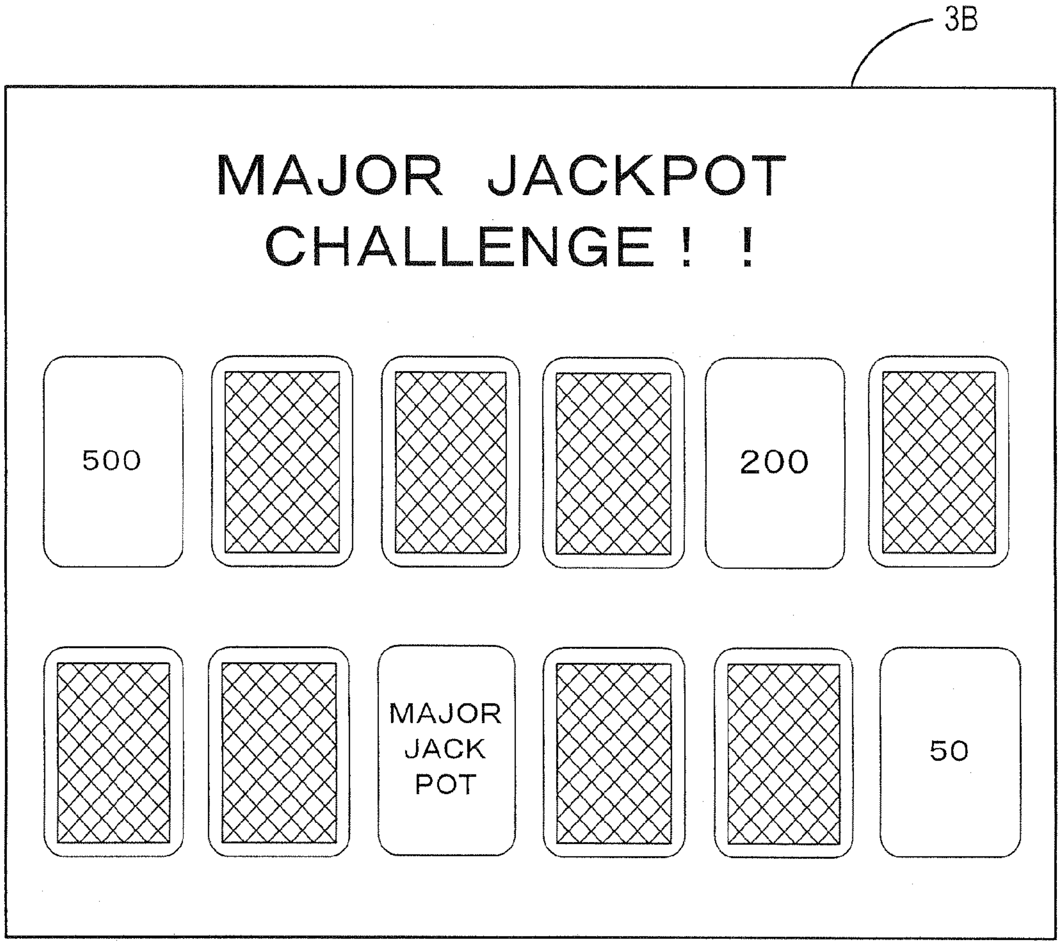
FIG. 23 is a view showing one example of the MAJOR progressive chance game in the slot machine in accordance with one or more aspects of the invention.

FIG. 23 shows a condition where four selection items (four of cards) are selected. In FIG. 23, 500 credit, 200 credit, and 50 credit will be provided. Also, since the card on which "MAJOR JACK POT" is displayed is displayed, the MAJOR progressive bonus is realized. As a result, credit amount corresponding to the MAJOR jackpot is provided. Also, remaining number of selectable selection items can be displayed while the player selects the selection item.

Here, the number of selectable selection items is determined when the game mode is shifted to the progressive chance game. For example, the number of selectable selection items is determined based on the bet amount in the base game. In this time, as the bet amount is larger, the number of selectable selection items is larger. For example, as the bet amount is increased by "1" credit, the selection item may be increased by "1".

Here, the number of selectable selection items may be less than the number of displayed selection items. For example, in the example shown in FIG. 22, since the number of the displayed selection items is "12", maximum value (upper limit) of the number of selectable selection items is "11". Herewith, a case of "the progressive bonus is certainly realized" is eliminated. Accordingly, uncertainty of winning for the progressive bonus can be provided. Consequently, the uncertainty of the winning for the progressive bonus can enhance an interest for choice of the selection items.

Figure 24:
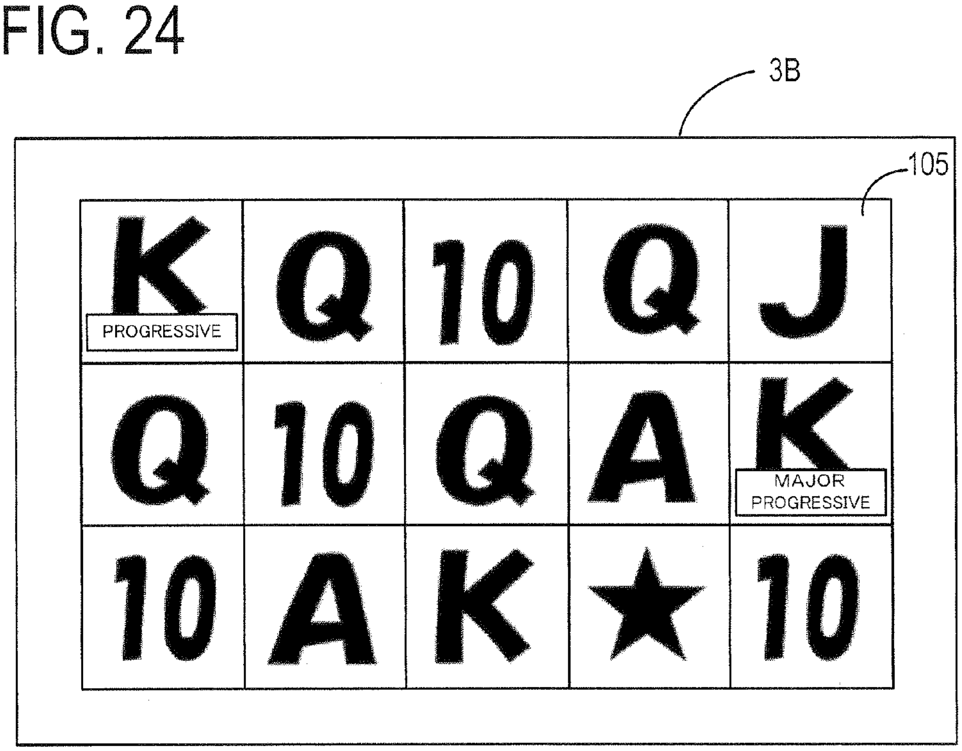
FIG. 24 is a view showing a condition where symbols are stopped on variably display portions of the slot machine in accordance with one or more aspects of the invention.

As mentioned above, in the embodiment, if three or more of the marks are displayed on the symbol display portions, the progressive chance game will be executed. Here, for example, as shown in FIG. 24, if two of the marks are displayed on the symbol display portions, the game mode is not shifted to the progressive chance game. However, since the mark 52B is displayed on the reel display portion 105, the player looking the game result may falsely recognize that the MAJOR progressive chance game can be executed.

Figure 25:
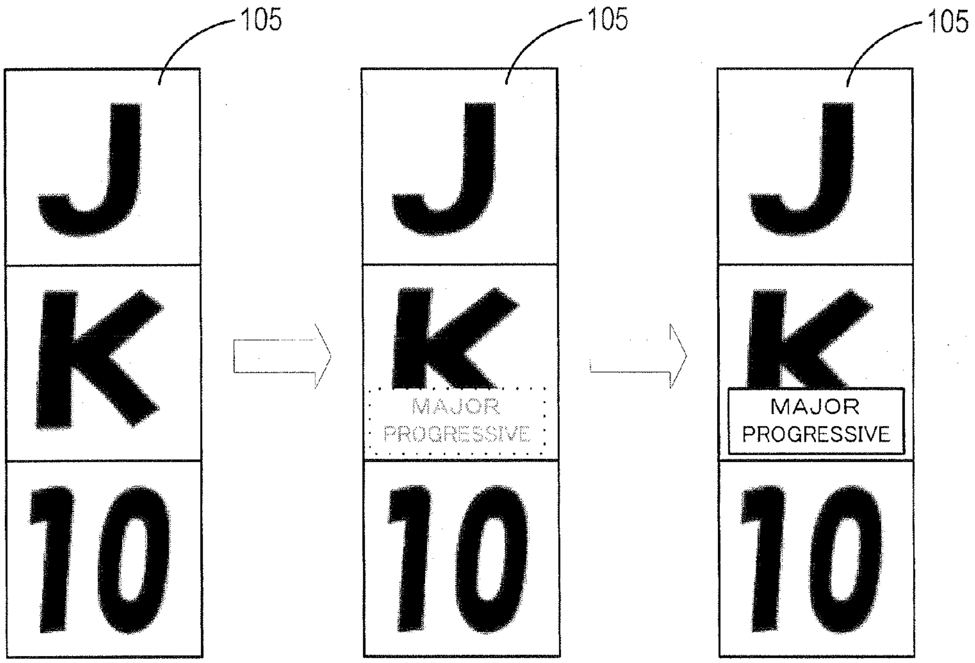
FIG. 25 is a view showing a condition where a mark is displayed gradually in the reel display portion in the slot machine in accordance with one or more aspects of the invention.

To prevent the false recognition, as shown in FIG. 25, the mark 52B is not displayed immediately after the symbols are displayed, after that, the marks 52B may be displayed gradually. Accordingly, the mark 52B is displayed as the game result. Here, since the mark 52B is displayed gradually, the false recognition of the player such as "the progressive chance game will be executed" can be prevented.

In the embodiment, the first symbols and the second symbols are used and each of the second symbols is made up of the first symbols and the progressive mark. Also, the normal award is provided based on the combination of the first symbols. Also, if the predetermined number or more of the progressive marks are displayed, one of the progressive chance games will be executed based on the display pattern, as a special award. Accordingly, it can provide higher interest to the player.

Here, one or more aspects of the invention is not limited to above embodiments and various changes and modifications can be done within the scope of the invention certainly.

For example, in another embodiment, only the mark 52A (the PROGRESSIVE mark) can be used as the mark to be displayed on the first symbol. In this case, it can be determined whether or not the progressive chance game is executed if the number of the displayed marks 52A is a predetermined or more.

Also, it may be determined either the MAJOR progressive chance game or the MINOR progressive chance game will be executed based on the displayed marks. For example, if the number of the displayed marks is "2", the MINOR progressive chance game will be executed, and if the number of the displayed marks is "3" or more, the MAJOR progressive chance game will be executed. In this case, the type of the progressive chance game may be considered or unconsidered.

The invention is not limited to above embodiments and various changes and modifications can be done within the scope of the invention certainly. For example, in a case where one or more aspects of the invention are implemented by the hybrid type slot machine which has the mechanical reels and transparent liquid crystal display device, the mechanical reels can be used in the base game and video reels displayed on the transparent liquid crystal display device can be used in the free game. Also, in the same game, some reel can be implemented by the mechanical reel and other reel can be implemented by the video reel. Further, one or more aspects of the invention may have a third special reel which is more beneficial. Also, in the free game, if a predetermined condition is met, the third special reel may be used.

Also, one or more aspects of the invention can be applied to gaming machines other than the slot machine. For example, in card game machines which execute poker game or the like, if a predetermined condition is met, the progressive chance game can be executed. In this case, if a predetermined winning combination is realized, the MAJOR progressive chance game or the MINOR progressive chance game can be executed.

Also, one or more aspects of the invention can be implemented as a playing method to execute above processes. Further, one or more aspects of the invention can be implemented as a program to execute above processes in one or more computers, and a tangible medium in which the program is stored.

What is claimed is:

1. A gaming machine comprising:

a display capable of displaying a plurality of selection items; and a processor that controls game sessions, the game sessions including a first game and a second game;

wherein the processor is programmed to:

(a) accept a bet amount, (b) accept a predetermined indication, (c) execute the first game in response to the accepted indication, (d) execute the second game if a predetermined condition is met, wherein the processor selects any one among a plurality of progressive chance game providing different payout amounts as the second game based on the bet amount of the first game, (e) display the plural selection items on the display in the second game, (f) determine a selectable number of the selection items, (g) increase the selectable number of the selection items as the bet amount increases, a maximum value of the selectable number of the selection items being less than a display number of the selection items on the display, and (h) provide an award corresponding to a selected selection item, wherein the plurality of progressive chance game includes a first progressive chance game and a second progressive chance game providing a higher payout amount than the first progressive chance game, wherein a probability of the second progressive chance game being selected as the second game is a first probability and a probability of the first progressive change game being selected as the second game is a second probability, when the bet amount of the first game is greater than a threshold, wherein the probability of the second progressive change game being selected as the second game is a third probability and the probability of the first progressive change game being selected as the second game is a fourth probability, when the bet amount of the first game is less than the threshold, and wherein the first probability is higher than the third probability, and the second probability is lower than the fourth probability, and wherein each of the first, second, third, and fourth probabilities is higher than 0% and lower than 100%.

2. The gaming machine according to claim 1, wherein as the accepted bet amount increases by one credit, the selectable number becomes increases by one.

3. The gaming machine according to claim 1, wherein at least one of the displayed selection items corresponds to a jackpot for providing a jackpot amount, and a portion of the bet amount of the first game is accumulated to the jackpot amount.

4. A gaming machine comprising:

a display capable of displaying a plurality of symbols and plurality of selection items; and a processor that controls game sessions, the game sessions including a first game and a second game; wherein the processor is programmed to:

(a) accept a bet amount, (b) accept a predetermined indication, (c) execute the first game in response to the accepted indication, (d) execute the second game if a combination of the displayed symbols is a winning combination, wherein the processor selects any one among a plurality of progressive chance game providing different payout amounts as the second game based on the bet amount of the first game, (e) display the plural selection items on the display in the second game, (f) determine a selectable number of the selection items, (g) increase the selectable number of the selection items as the bet amount increases, a maximum value of the selectable number of the selection items being less than a display number of the selection items on the display, and (h) provide an award corresponding to a selected selection item, wherein the plurality of progressive chance game includes a first progressive chance game and a second progressive chance game providing a higher payout amount than the first progressive chance game, wherein a probability of the second progressive change game being selected as the second game is a first probability and a probability of the first progressive change game being selected as the second game is a second probability, when the bet amount of the first game is greater than a threshold, wherein the probability of the second progressive change game being selected as the second game is a third probability and the probability of the first progressive change game being selected as the second game is a fourth probability, when the bet amount of the first game is less than the threshold, wherein the first probability is higher than the third probability, and the second probability is lower than the fourth probability, and wherein each of the first, second, third, and fourth probabilities is higher than 0% and lower than 100%.

5. The gaming machine according to claim 4, wherein as the accepted bet amount increases by one credit, the selectable number increases by one.

6. The gaming machine according to claim 4, at least one of the displayed selection items corresponds to a jackpot for providing a jackpot amount, and a portion of the increasable bet amount of the first game is accumulated to the jackpot amount.

7. A gaming machine comprising:

a display capable of displaying a plurality of video reels having plurality of symbols and plurality of selection items; and a processor that controls game sessions, the game sessions including a first game and a second game; wherein the processor is programmed to:

(a) accept a bet amount, (b) accept a predetermined indication, (c) execute the first game in response to the accepted indication, (d) execute the second game if a combination of the displayed symbols is a winning combination, wherein the processor selects any one among a plurality of progressive chance game providing different payout amounts as the second game based on the bet amount of the first game, (e) display the plural selection items on the display in the second game, (f) determine a selectable number of the selection items, (g) increase the selectable number of the selection items as the bet amount increases, a maximum value of the selectable number of the selection items being less than a display number of the selection items on the display, and (h) provide an award corresponding to a selected selection item, wherein the plurality of progressive chance game includes a first progressive chance game and a second progressive chance game providing a higher payout amount than the first progressive chance game, wherein a probability of the second progressive change game being selected as the second game is a first probability and a probability of the first progressive change game being selected as the second game is a second probability, when the bet amount of the first game is greater than a threshold, wherein the probability of the second progressive change game being selected as the second game is a third probability and the probability of the first progressive change game being selected as the second game is a fourth probability, when the bet amount of the first game is less than the threshold, wherein the first probability is higher than the third probability, and the second probability is lower than the fourth probability, and wherein each of the first, second, third, and fourth probabilities is higher than 0% and lower than 100%.

8. The gaming machine according to claim 7, wherein as the accepted bet amount increases by one credit, the selectable number increases by one.

9. The gaming machine according to claim 7, at least one of the displayed selection items corresponds to a jackpot for providing a jackpot amount, and a portion of the increasable bet amount of the first game is accumulated to the jackpot amount.

10. The gaming machine according to claim 1, wherein a sum of the first probability and the second probability is 100%, and a sum of the third probability and the fourth probability is 100%.

11. The gaming machine according to claim 4, wherein a sum of the first probability and the second probability is 100%, and a sum of the third probability and the fourth probability is 100%.

12. The gaming machine according to claim 7, wherein a sum of the first probability and the second probability is 100%, and a sum of the third probability and the fourth probability is 100%.

* * * * *